United States Patent [19]
Park et al.

[11] Patent Number: 5,453,848
[45] Date of Patent: Sep. 26, 1995

[54] PICTURE PROCESSING APPARATUS

[75] Inventors: Seung H. Park, Kyungsangbuk-do; Jin S. Park, Junrabuk-do; Jun M. Kim, Kyeongki-do, all of Rep. of Korea

[73] Assignee: Hyundai Electronics Industries, Rep. of Korea

[21] Appl. No.: 217,920

[22] Filed: Mar. 25, 1994

[30] Foreign Application Priority Data

Mar. 27, 1993 [KR] Rep. of Korea ............... 1993-4885

[51] Int. Cl.$^6$ ............................................. H04N 1/38
[52] U.S. Cl. ...................... 358/464; 358/461; 358/462
[58] Field of Search ........................ 358/447, 460–464, 358/443; 348/572, 615, 618, 697; H04N 1/38

[56] References Cited

U.S. PATENT DOCUMENTS 5,262,873  11/1993  Ishizuka ................................ 358/463
5,321,526  6/1994  Takenaka .............................. 358/464

Primary Examiner—Edward L. Coles, Sr.
Assistant Examiner—Kim Yen Vu
Attorney, Agent, or Firm—Ronald Craig Fish Falk, Vestal & Fish

[57] ABSTRACT

An image processing apparatus useful in, for example, FAX machines, for processing a binary or multiple level tone data in an image including a switch for selectively outputting either a binary level or the multiple level tone pattern in accordance with a selection signal the state of which is determined by the interline reading interval times while scanning the image on an original document. The image processing apparatus includes a temporary storage register for storing a digital binary or multiple level tone pattern, and a selection switch controlled by a binary/multiple level tone selection signal for selectively coupling to the maximum voltage reference input of an analog-digital converter an output signal either from a background color compensator when the binary/multiple level tone selection signal indicates binary level tone image processing is occurring or a voltage value established by a first voltage divider whose resistor values are predetermined according to output voltage levels from the image sensor during multiple level tone image scanning. The digital-analog converter converts binary or multi-level tone pattern data output from temporary storage register into an analog signal using a minimum voltage reference established by a second voltage divider which has resistor values selected in accordance with the minimum output levels from the image sensor. The analog signal from the digital-analog converter is converted to a voltage and compared in a comparison calculator to generate digital data representing the scanned image.

2 Claims, 5 Drawing Sheets

| C0 | C0 | C0 | C0 |

| DC | DC | DC | DC |

| F0 | F0 | F0 | F0 |

FIG. 2A

| 80 | C0 | 90 | D0 |
| --- | --- | --- | --- |
| E0 | A0 | F0 | B0 |
| 98 | D8 | 88 | C8 |
| F8 | B8 | E8 | A8 |

FIG. 2B

| C9 | CA | CA | C9 | C9 | C8 | C8 | C9 |
|----|----|----|----|----|----|----|----|

BRIGHT

| DD | DE | DE | DD | DD | DC | DC | DD |
|----|----|----|----|----|----|----|----|

NORMAL

| ED | EE | EE | ED | EC | EC | EC | ED |
|----|----|----|----|----|----|----|----|

DARK

FIG. 4A

| C1 | C2 | C2 | C1 | C1 | C0 | C0 | C1 |
|----|----|----|----|----|----|----|----|

BRIGHT

| CF | D0 | D0 | CF | CF | CE | CE | CF |
|----|----|----|----|----|----|----|----|

NORMAL

| E1 | E2 | E2 | E1 | E1 | E0 | E0 | E1 |
|----|----|----|----|----|----|----|----|

DARK

FIG. 4B

| 81 | C1 | 91 | D1 | 85 | C5 | 95 | D5 |
|----|----|----|----|----|----|----|----|
| E1 | A1 | F1 | B1 | E5 | A5 | F5 | B5 |
| 99 | D9 | 89 | C9 | 9D | DD | 8D | CD |
| F9 | B9 | E9 | A9 | FD | BD | ED | AD |
| 87 | C7 | 97 | D7 | 83 | C3 | 93 | D3 |
| E7 | A7 | F7 | B7 | E3 | A3 | F3 | B3 |
| 9F | DF | 8F | CF | 9B | DB | 8B | CB |
| FF | BF | EF | AF | FB | BB | EB | AB |

FIG. 5

PICTURE PROCESSING APPARATUS

FIELD OF THE INVENTION

This invention relates to a picture processing apparatus in an image processing system, and in particular to a picture processing apparatus handling binary and multiple level tone picture data.

1. Background of the Invention

In general, image processing systems are included in optical machines where an original is read by means of an image sensor. Examples of such optical machines include facsimile machines, image scanners, photocopiers or the like. In such image processing systems, the image sensor reads an original and generates signals which allow a pattern to be stored in a memory which is a digital representation of the original. This pattern may be output for transmission or copying. The patterns may be stored in the memory in the form of binary or multi-level tone values.

2. Prior Art and its Drawbacks

A conventional picture processing apparatus for a facsimile machine is shown in the block diagram of FIG. 1, and comprises a central processing unit 10 which provides overall control of the system. The central processing unit provides picture processing data prior to reading a picture. An address decoder 20, actuated by the picture processing data from the central processing unit 10, designates a start address for the binary or multi-level tone pattern stored in read only memory 30. The system also comprises a background color compensator 40 for compensating a background color of an original in response to an analog picture signal derived from the image sensor (not shown), a digital-analog converter 50 for converting the data output from the pattern read only memory 30 into an analog signal with an output from the background color compensator being at the maximum. The system also comprises a current-voltage converter 60 for converting the analog value output from the digital-analog converter 50 into a voltage value, and a comparison calculator 70 for comparing the voltage value from the current-voltage converter and an analog picture output value from the image sensor to generate a digital picture.

Examples of the binary and multi-level tone patterns are shown in FIGS. 2A and 2B. FIG. 2A shows data values for different intensities: bright, normal and dark for a binary level pattern. FIG. 2B shows those of a multi-level tone pattern. They are both stored in the pattern read only memory 30 shown in FIG. 1.

In operation, an analog picture output taken out from an original by the image sensor is applied via the back ground color compensator 40 to the digital-analog converter 50 at the positive reference voltage VR+. The negative reference voltage VR− of the converter is coupled to ground. The converter thus operates to convert 8-bit data to an analog signal in a range with the maximum and the minimum defined by the positive and the negative reference voltage.

The 8-bit data from the pattern read only memory 30 may be any of three kinds of binary level or multi-level tone pattern shown in FIGS. 2A and 2B, respectively. The central processing unit 10 signifies whether a picture being processed is either of them prior to the picture being read from an original, and causes the address decoder to designate a corresponding start address to the binary level or multi-level tone pattern. As a picture reading operation starts, a clock signal (not shown) provided from the image sensor is applied to the address decoder, causing pattern data to be output from the pattern read only memory starting at the designated start address. As the clock proceeds, the address decoder advances the address to output the subsequent 8-bit data from the pattern read only memory. The data from the pattern read only memory are applied to the digital-analog converter 50 which converts the 8-bit digital data into corresponding analog values. The 8-bit digital data are converted to the voltage form by the current-voltage converter 60 and then compared to the picture data for acquiring a picture output.

The conventional picture processing apparatus provides analog picture outputs susceptible of varying in amplitude. This is due to the fact that a line-to-line reading interval time varies upon reading an original even if the same original is transmitted and photocopied. This causes variation in picture intensity which is additionally because the binary level and the multiple level tone patterns stored in the pattern read only memory are invariably fixed. The output data from the image sensor do practically not reach zero voltage whereas the negative reference voltage of the digital-analog converter is ground potential, so that the conversion bandwidth the digital-analog converter may not match with a range of the output from the image sensor. The signal is applied to the digital-analog converter 50 positive reference terminal from the background compensator 40 in the case of multiple level tone which occurs where an original is a photographic picture or a drawing. The digital-analog converter 50 effects conversion with the signal directly from the background compensator 40 as the maximum value making it virtually impossible to reproduce tone of color portion or portions of an original being read by an image scanner.

SUMMARY OF THE INVENTION

THE OBJECT OF THE INVENTION

For overcoming the above stated drawbacks of the conventional apparatus, the object of the invention is to provide a picture processing apparatus for differentially outputting the binary level or the multiple level tone pattern in accordance with the interline reading interval times during reading an original.

THE CONSTITUTION OF THE INVENTION

A picture processing apparatus embodied by the invention to achieve the above object comprises a central processing unit controlling the overall system and providing picture processing data for selection between a binary level and a multiple level tone prior to reading a picture, an address decoder actuated by the picture processing data from the central processing unit to designate a start address of a binary or multi-level tone pattern, a register storing the binary and multi-level tone patterns to be output from the start address designated by the address decoder, a background color compensator for compensating a background color of an original in response to an analog picture signal derived from an image sensor for binary level processing, a selection switch applied with a binary/multiple level tone selection signal for selectively allowing output of an output signal from said background color compensator for binary level processing or a voltage value generated by a first voltage divider whose resistance values are selected for picture output values from an image sensor during multiple level processing, a digital-analog converter for converting the data output from said register into an analog signal with a voltage value generated by a second voltage divider having resistance values selected to provide a minimum voltage reference, a current-voltage converter for converting the analog value output from the digital-analog converter into a voltage value and a comparison calculator for comparing the voltage value from the current-voltage converter and an analog picture output value from an associated image sensor for generating a digital representation of a picture.

BRIEF DESCRIPTION OF THE DRAWINGS

FIG. 2A and 2B shows exemplary binary and multiple level tone patterns, respectively, relating to the apparatus shown in FIG. 1;

FIGS. 4A and 4B show exemplary binary and multiple level tone patterns, respectively, in the invention;

FIG. 5 shows a 64 level tone pattern in the invention; and

DETAILED DESCRIPTION OF THE PREFERRED EMBODIMENT

Figure 1:
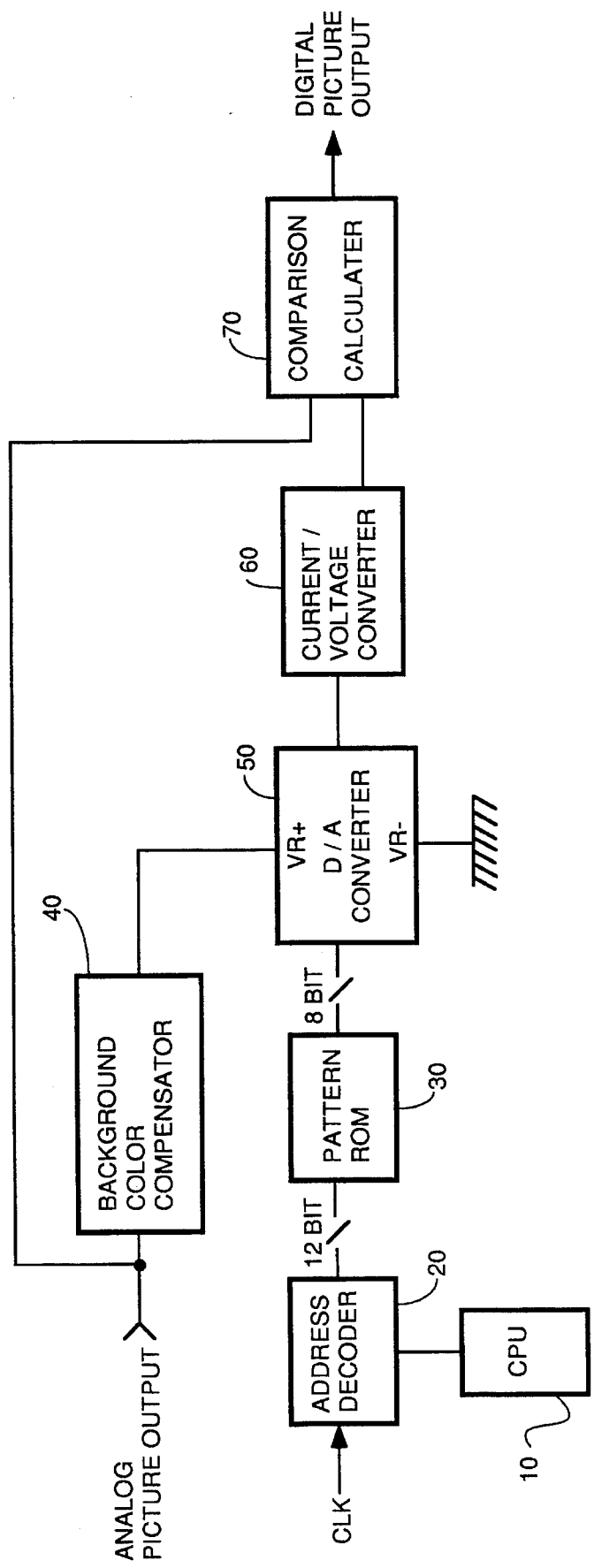
FIG. 1 shows a block diagram of the conventional picture processing apparatus.
Figure 3:
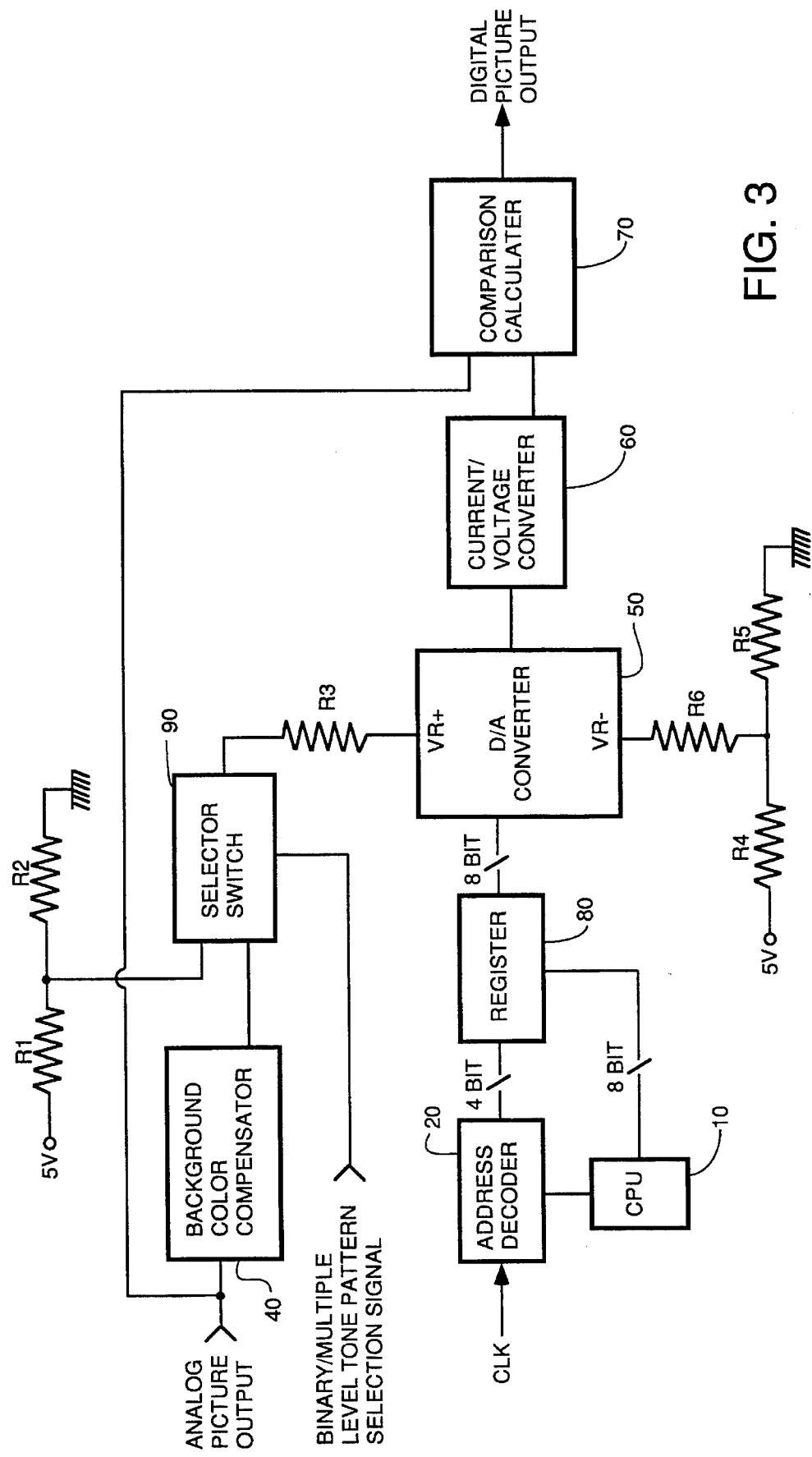
FIG. 3 shows a block diagram of a picture processing apparatus according to the invention.

An embodiment of the invention will described with reference to FIG. 3. It comprises a central processing unit 10 controlling the system and providing picture processing data for selection between a binary level and a multiple level tone prior to reading a picture, an address decoder 20 actuated by the picture processing data from the central processing unit to designate a start address of a binary or multi-level tone pattern, a register 80 storing the binary and multi-level tone patterns to be output at the start address designated by the address decoder, a background color compensator 40 for compensating a background color of an original in response to an analog picture signal derived from an image sensor for binary level processing, a selection switch 90 applied with a binary/multiple level tone selection signal for selectively allowing output of an output signal from said background color compensator for binary level processing and a voltage value distributed by first resistance means R1 and R2 whose values are predetermined for picture output values from an image sensor for multiple level processing, a digital-analog converter 50 for converting the data output from said register into an analog signal with a voltage value distributed by second resistance means R4 and R5 being applied to the low voltage reference input of the digital-analog converter as the minimum, a current-voltage converter 60 for converting the analog value output from the digital-analog converter into a voltage value, and a comparison calculator 70 for comparing the voltage value from the current-voltage converter and an analog picture output value from an associated image sensor for generating a digital representation of the picture scanned by the image sensor. The digital-analog converter 50 has positive and negative reference terminals VR+ and VR− with resistors R3 and R6, respectively, connected thereto.

In operation, the register 80 under control of the CPU 10 stores a binary or multiple level tone pattern. An image on an original placed adjacent the image sensor is read after the pattern data are stored in the register. Before reading an original, a binary/multiple level tone selection signal causes the selection switch 90 to select either the output of the background color compensator or the voltage value supplied by the voltage divider comprised of resistors R1 and R2 to resistor R3. If binary level processing is selected by the state of the binary/multiple level tone selection signal, the signal from the background color compensator 40 is applied by the switch 90 to the resistor R3 for conversion to a current value which is then applied to the positive reference terminal VR+ of the digital-analog converter 50. The negative reference terminal VR− thereof has applied thereto a voltage generated by the voltage divider comprised of the resistances R1 and R2 which establishes the minimum value of a picture signal from the image scanner. The voltage value generated by the R1/R2 voltage divider is converted to a current value through the resistor R6.

If multiple level, e.g., 64 level, tone processing is selected, the selection switch 90 causes the digital/analog converter 50 to have applied at its positive reference terminal VR+ the voltage generated by the voltage divider comprised of the resistors R1 and R2 as the maximum value for a picture signal from the image scanner. This voltage value from the R1/R2 voltage divider is converted to a current by the resistor R3. The negative reference voltage is applied in the same fashion as in the case where binary processing was selected.

The digital-analog converter 50 serves to convert the digital 8-bit signal from the register 80 to an analog form with the positive and negative reference voltages being at the maximum and the minimum levels established by the R1/R2 and R4/R5 voltage dividers, respectively. The 8-bit signal applied to the digital-analog converter 50 may be a binary or multiple level tone pattern stored in the register 80 prior to reading the image on the original. As the reading of the image on the original document starts, the addresses in register 80 from which the binary or multiple level tone pattern data is output increase in synchronism with a clock signal supplied to the address decoder 20 by the image sensor. As a result, a pattern stored in the register 80 is issued to the digital-analog converter 50 wherein it is converted to an analog signal. This analog signal is, in turn, converted by the current/voltage converter 60 to a voltage value for application to the comparison calculator 70. The comparison calculator compares the analog voltage pattern received from the current/voltage converter 60 with the analog picture output for the image sensor and generates a binary digital or multiple level digital tone pattern.

Figure 6:
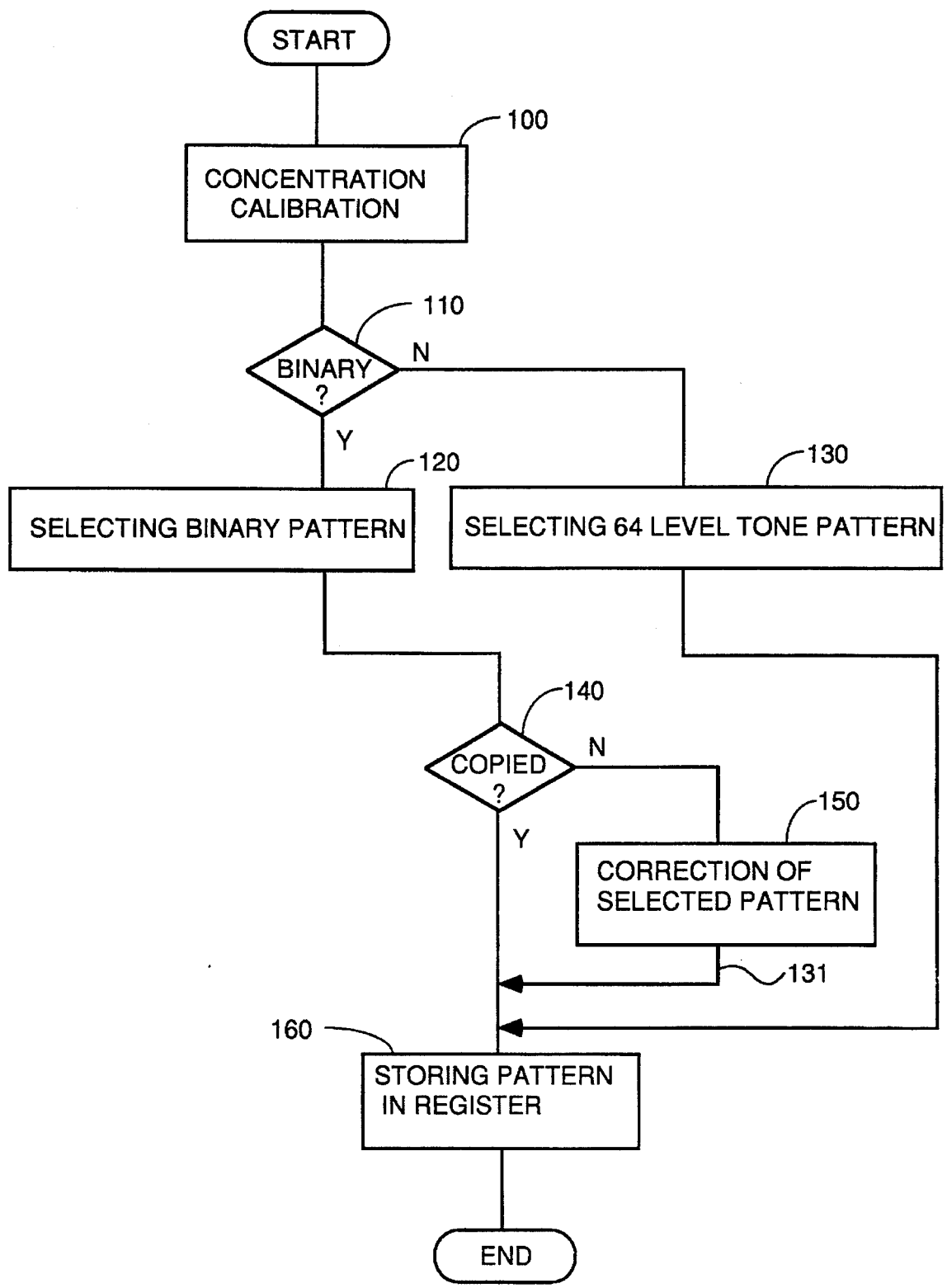
FIG. 6 shows a flow chart for a procedure for storing a binary and 64 level tone patterns in a register in the invention.

Referring to FIG. 6, a method for storing a binary or multiple level tone pattern to the register 80 will be described.

Before reading of the image on the original starts, a concentration calibration is performed for bright, normal and dark light concentrations in the image. After the concentration is calibrated in step 100, a test is performed in step 110 to determine whether the image to be processed is a binary or 64 level tone pattern. If it is a binary level pattern, sets of patterns shown in FIGS. 4A and 4B may be selected as symbolized by block 130. If it is a 64 level tone pattern, a pattern shown in FIG. 5 may be selected as symbolized by step 120. If the pattern selected is a 64 level tone pattern, it is stored in the register 80. If it is a binary level pattern, whether it is to be copied or transmitted is determined by the test represented by block 140. If it is determined to be copied, the pattern shown in FIG. 4A may be stored in the register 80 by operation of the CPU 10 as symbolized by block 160. If it is to be transmitted, the multiple level bit pattern of FIG. 4B may be corrected and stored in the register 80 as symbolized by path 131 leading to block 160.

EFFECTS AND ADVANTAGES OF THE INVENTION

As described in the foregoing, the invention permits adjustment of a binary or multiple level tone pattern in an image on an original document which is being read by an image sensor. The invention permits a determined degree of picture quality to be achieved when the original image is copied or transmitted as a FAX. The invention uses a register in which predetermined bit patterns are stored which, after conversion to an analog signal, are used for comparison with an analog signal from the image sensor. The digital-analog converter used to do this conversion has a positive reference terminal connected to an output from a selection switch in order to apply a signal from the background color compensator or a voltage determined by a voltage divider in accordance with the maximum value output from the image sensor for a binary level or a multiple level tone pattern, respectively. A voltage set by a voltage divider and determined according to the minimum output of the image sensor is applied to the negative reference terminal of the digital-analog converter for improving picture quality with tone reproducibility enhanced.

What is claimed is:

1. A picture processing apparatus for processing images, comprising:

a register storing one or more different tone patterns, each of which has a different starting address and each of which is comprised of a plurality of digital numbers stored in sequential addresses within said registers, said digital numbers used for establishing comparison thresholds, some of said different tone patterns being intended for use in processing binary tone level images and some of said different tone patterns being intended for use in processing multilevel tone images, said register having a digital output at which at least one of said digital numbers from a tone pattern stored therein appears, and having an address input for receiving an address which controls which of said digital numbers appears at said output;

an address decoder having an address output coupled to said address input of said register, for supplying address data to said register and having a picture processing data input for receiving picture processing data which said decoder decodes to generate starting address data for supplying to said register via said address input, and having a clock input for receiving a clock signal which causes the address appearing at said address output of said address decoder to be incremented synchronously with said clock signal thereby causing different ones of said digital numbers stored in said register to appear at said digital output of said register;

a central processing unit having a picture processing data output coupled to said address decoder and a data output coupled to said register, said central processing unit for determining if an image to be processed is a binary tone level image or a multilevel tone image and, if said image to be processed is a binary tone image, for supplying picture processing data to said address decoder for decoding therein into a starting address for a tone pattern for binary tone images in said register, and, if said image to be processed is a multilevel tone image, for supplying picture processing data to said decoder for decoding therein into a starting address in said register for a multilevel tone pattern;

a background color compensator having an input for receiving an analog picture signal derived from said image being processed, and having an output at which a first positive reference signal appears;

a source for supplying a second, fixed-level positive reference signal;

a selector switch means having a first input coupled to receive said first positive reference signal, a second input coupled to receive said second, fixed-level positive reference signal, and having an output at which a positive reference current signal appears, and having an input for receiving a binary/multiple level tone pattern selection signal, said selector switch means for selecting either said first positive reference signal or said second, fixed-level positive reference signal for conversion to said positive reference current signal in accordance with the state of said binary/multiple level tone pattern selection signal and for presenting said positive reference current signal at said output;

a source for supplying a fixed level negative reference current signal;

a digital-to-analog converter having an input coupled to said digital output of said register for receiving said digital numbers appearing at said digital output of said register in synchronization with said clock signal, and having a positive reference signal input coupled to receive said positive reference current signal, and having a second input for receiving said negative reference current signal, and having an analog output at which an analog signal appears the magnitude of which is determined by the value of said said digital output of said register, the magnitude of said positive and negative reference current signals establishing the dynamic range of said analog signal appearing at said analog output;

a current/voltage converter having an input for receiving said analog output signal from said digital-to-analog converter and having an output at which a comparison threshold voltage signal appears, the magnitude of which is derived from the magnitude of said analog signal output by said digital-to-analog converter;

a comparison calculator having an input coupled to receive said analog picture signal derived from said image being processed, and having an input for receiving said threshold voltage signal from said current/voltage converter, said comparison calculator for comparing said analog picture signal derived from said image being processed to said threshold voltage signal and for generating a digital output signal which digitally encodes the image being processed.

2. The apparatus of claim 1 further comprising means coupled to said register for correcting said tone patterns stored therein if the output data from said comparison calculator is to be transmitted.

* * * * *